United States Patent [19]
Pacifici et al.

[11] Patent Number: 6,059,978
[45] Date of Patent: May 9, 2000

[54] METHOD OF REMOVING COLORANTS FROM WASTEWATER

[75] Inventors: Joseph A. Pacifici, Anderson; Daniel G. Sims, Greer, both of S.C.

[73] Assignee: Simco Holding Corporation, Greer, S.C.

[21] Appl. No.: 09/073,540

[22] Filed: May 6, 1998

[51] Int. Cl.[7] .................................................. C02F 1/56
[52] U.S. Cl. ........................ 210/727; 210/732; 210/735; 210/736; 210/917
[58] Field of Search ................................. 210/725, 727, 210/728, 732, 733, 734, 735, 736, 917

[56] References Cited

U.S. PATENT DOCUMENTS

| | | | |
|---|---|---|---|
| 3,290,310 | 12/1966 | Mort et al. | 260/249.9 |
| 3,484,837 | 12/1969 | Odom et al. | 210/917 |
| 3,822,205 | 7/1974 | Oohara et al. | 210/52 |
| 4,025,429 | 5/1977 | Neuschutz | 210/52 |
| 4,088,573 | 5/1978 | Nakajima et al. | 210/53 |
| 4,308,149 | 12/1981 | Selvarajan | 210/736 |
| 4,425,238 | 1/1984 | Degen et al. | 210/666 |
| 4,428,840 | 1/1984 | Mudder et al. | 210/717 |
| 5,326,479 | 7/1994 | Sarkar et al. | 210/719 |
| 5,360,551 | 11/1994 | Weber | 210/719 |
| 5,407,577 | 4/1995 | Nghiem | 210/606 |
| 5,529,697 | 6/1996 | Braasch et al. | 210/710 |
| 5,589,075 | 12/1996 | Sivakumar et al. | 210/727 |
| 5,611,934 | 3/1997 | Shepperd et al. | 210/719 |
| 5,741,768 | 4/1998 | Falbaum et al. | 510/339 |

*Primary Examiner*—Peter A. Hruskoci
*Attorney, Agent, or Firm*—Kennedy, Davis & Hodge, LLP

[57] ABSTRACT

Cationic polymers are added to wastewater containing colorants to form a cationic polymer/colorant complex. Anionic polymers are then added to the wastewater to produce a flocculent precipitate that is separated from the wastewater.

7 Claims, No Drawings

METHOD OF REMOVING COLORANTS FROM WASTEWATER

TECHNICAL FIELD

The present invention relates to methods for removing colorants from wastewater.

BACKGROUND OF THE INVENTION

Wastewater from domestic and industrial sources must be treated before it is reintroduced into the water supply. In this regard, publicly owned treatment works (POTW) use various techniques to purify water, depending on the pollutant content of the water. The diversity of pollutants in wastewater may be great, including such substances as colorants and pigments. Colorants encompass both color and opacity agents, which impart color to water and are exemplified by dyestuffs. Colorants typically have either a negative or neutral electric charge and are water soluble. In contrast, pigments are water insoluble and are exemplified by the coloring agents suspended in paint and ink. However, in this application the term colorant encompasses both color and opacity agent type colorants and pigments.

Typically, POTW use pretreatment techniques in combination with conventional biomass sludge systems and secondary purification systems to treat incoming wastewater from domestic and industrial waste streams. Such pretreatment techniques include the use of chemical oxidizing agents. These oxidizing agents are discussed in the April 1998 article entitled *Decolorization of Dyes Using Uv/$H_2O_2$ Photochemical Oxidation* by Yang, Wyatt, and Baharsky in the AATCC *Textile Chemist and Colorist,* Vol. 30, No. 4, pp. 27–35. However, colorants in waste streams present a challenge to POTW since they tend to be resistant to biomass degradation as well as oxidative purification. Thus, colorants pass through water treatment systems thus leaving residual color or opacity agents in purified potable water. Concerns over possible carcinogens in the water supply make this undesirable in addition to aesthetic considerations.

The difficulty in decolorizing colorants in wastewater is primarily due to their extreme stability. The few oxidizing agents that are somewhat effective in reducing colorant content, such as chlorine and ozone, suffer from efficiency and cost limitations. These oxidizing agents are expensive and do not significantly reduce the colorant content of wastewater unless added in very substantial quantities. Furthermore, these oxidizing agents have the potential for generating toxic organics that are harmful to both humans and the environment. Other oxidizing agents, such as hydrogen peroxide, which are discussed in the AATCC article, are only effective with limited classes of dyes.

As a result of the difficulties in eliminating colorants from industrial waste streams, those industries and mills that discharge colorants from their manufacturing processes are under increased pressure by regulatory agencies to eliminate these pollutants from their waste streams before these are discharged to the POTW facilities.

As a result of this increased governmental pressure to address the colorant pollution problem at the source, methods have been recently developed that reduce some specific colorants. The current commercial and experimental methods for decolorizing wastewater are discussed in depth in the 1996 publication of John Wiley & Sons, Inc. entitled *Environmental Chemistry of Dyes and Pigments,* edited by A. Reife and H. Freeman. These methods include carbon adsorption, dye reduction, ozonations, electrochemical techniques, chemical pretreatments, aerobic and anaerobic treatments, and powdered activated carbon-activated sludge system or PACT®. These removal methods differ in efficiency levels and effectiveness depending on the type of colorant to be removed. Many require relatively lengthy time periods to be effective.

Even with the availability of these specific colorant removal techniques, no single method is known which efficiently and effectively removes colorants derived from most acid dyes, fiber reactive dyes, direct dyes, disperse dyes, basic dyes, vat and sulfur pigments and water-based paint and ink pigments. Although, while adsorption removal methods using activated carbon are widely used for dyes, they are ineffective for removal of disperse dyes and vat pigments. Anionic dyes, such as fiber reactive dyes, require reduction by hydrosulfite before activated carbon adsorption methods will effectively remove colorants.

In many situations, polymer flocculation, in combination with adsorption, is required for effective colorant removal. In others, coagulants such as alum, lime, ferric salts, with or without cationic polymers, or alum with powdered activated carbon (PAC), are used for colorant removal. However, multi-component and multi-stage colorant removal techniques are time consuming and expensive. The efficiency of the multi-stage colorant removal techniques often does not justify their costs.

Thus, given the practical limitations of currently available colorant removal techniques, a need remains for a colorant removal method that allows for the efficient removal of a wide range of colorants over relatively short time periods. Furthermore, a need remains for a colorant removal method that does not require costly steps to achieve a commercially acceptable level of residuals colorants.

SUMMARY OF THE INVENTION

In a preferred form of the invention colorants are removed from wastewater by first adding to the wastewater a cationic polymer in an amount sufficient to form a cationic polymer/colorant complex. An anionic polymer is then added in an amount sufficient to allow the cationic polymer/colorant complex to complex further with the anionic polymer to form a flocculent precipitate. Here the anionic polymer apparently encapsulates the cationic polymer/colorant complex in producing the flocculent precipitate. The precipitate is then separated from the wastewater in a conventional manner such as by filtration or sedimentation.

DETAILED DESCRIPTION

Cationic polymers are used extensively in wastewater treatment as flocculents, coagulants, and as dewatering aids in many different processes. They are also used in combinations with alums, powdered activated carbons, and activated sludges. There are generally three classes of these polymers, namely polyamines, diallyl dimethyl ammonium chlorides (DADMAC), and polyacryamides (PAM). The polyamides can be divided into the dicyandiamide/formaldehyde types, the epichlorohydrin/amine types, and the dicyandiamide/amine types. The dicyandiamide/amine types are exemplified by dicyandiamide/diethylenetriamine (DICY/DETA).

Numerous combinations of these cationic polymers exist with their molecular weights ranging from a few hundred to a few million. A common characteristic of these polymers is a net cation charge with the charge density depending on the nature of the polymer. In general, polyamines tend to have higher charge densities than those of the DADMAC or PAM type polymers.

As noted in the *Environmental Chemistry of Dyes and Pigments* previously cited, the best performing cationic polymers are those that are strongly cationic and of a high molecular weight. Processes using cationic polymers normally achieve about 50% colorant removal at high usage levels, such as 7.6 grams per liter (9/1). As a consequence, cationic polymers are not typically a practical method for decolorizing textile wastewater containing hydrolyzed reactive dyes.

Anionic polymers are poorly suited for colorant removal from wastewater since most wastewater contaminates themselves are anionic. Cationic polymers do not immediately form a coagulant with dyes and pigments because of their high solubility. Generally it takes hours or even days for the flocculence to occur.

There are numerous types of anionic polymers, such as sulfonated novolac, acrylic, modacrylic, urethanes and methacrylates. For the purposes of the following experiments sulfonated novolac type anionic polymers were used as preferred coupling agents to effect flocculation of cationic polymers. Sulfonated novolac polymers are also known as sulfonated aromatic aldehyde condensation products (SAC) or syntans. Sulfonated novolac polymers are described in the November 1989 issue of the American Association of Textile Chemists and Colorists journal, *The Textile Chemist and Colorist,* Vol. 21, No. 11, pp. 25–30, in an article by Harris and Hangey entitled *Stain Resist Chemistry for Nylon 6 Carpet.* This type of anionic polymer is economical, commercially available, and environmentally friendly, although any anionic polymer will suffice.

Experiment 1

Decolirazatin of Acid, Direct, and Fiber Reactive Dyes

A 1.0% stock solution was made using three acid dyes, three direct dyes, and three fiber reactive dyes. Ten gram aliquots of the stock solution were diluted with water to 1 liter to form the test solution. 1.0 g/l of cationic polymer (cat) was added to the dye solution and stirred. 1.0 g/l of anionic polymers was then added to the dye solution. The resultant mix was allowed to stand for one hour to allow total flocculation and settling. The resultant was filtered through filter paper to remove the sediment from solution. The filtrate was evaluated for color removal and compared with the test solution, by visually observing shade or opacity reduction. The results are reflected in Table I.

TABLE I

| Polymer Type | Color Removal (%) |
| --- | --- |
| DICY/AMINE | 99–100 |
| EPI/AMINE | <90 |
| DICY/Formaldehyde | <90 |
| DADMAC | <75 |
| PAM | <75 |

Experiment 2

Decolorization of Disperse and Basic Dyes

Two 1.0% stock solution samples were made. Three disperse dyes were added in one sample, and two basic dyes were added to the second stock solution sample. The procedure in Experiment 1 was followed and the experimental results are recorded in Table II.

TABLE II

| | Color Removal (%) | |
| --- | --- | --- |
| Polymer Type | Disperse Dyes | Basic Dyes |
| DICY/amine | 99–100 | 98–100 |
| EPI/amine | <90 | <75 |
| DICY/Formaldehyde | <90 | <75 |
| DADMAC | <75 | <50 |
| PAM | <75 | <50 |

Experiment 3

Decolorization of Latex Paint Pigments

Two 2.0% stock solutions were made with one sample including a flat black latex paint and the other including a semi-gloss, off-white latex paint. The procedure for Experiment 1 was used to produce the results shown in Table III.

TABLE III

| | Pigment Removal (%) | |
| --- | --- | --- |
| Polymer type | White | Black |
| DICY/amine | 98–100 | 99–100 |
| EPI/amine | <80 | <85 |
| DICY/formaldehyde | <80 | <85 |
| DADMAC | <50 | <50 |
| PAM | <50 | <50 |

Experiment 4

Decolorization of Vat and Sulfur Dye Pigments

A 2.0% stock solution was made using two Vat and two Sulfur pigment dyes. The procedure for Experiment 1 was used to yield the results recorded in Table IV.

TABLE IV

| Polymer type | Pigment Removal (%) |
| --- | --- |
| DICY/amine | 99–100 |
| EPI/amine | <80 |
| DICY/formaldehyde | <80 |
| DADMAC | <50 |
| PAM | <50 |

Experiment 5

Decolorization of Colorants and Pigments Using DICY/amine Polymer vs. Concentration A 1.0% master stock solution was made that contained acid dyes, direct dyes, fiber reactive dyes, latex paint pigments, sulfur and vat pigments, and disperse dyes. Three wastewater solutions were made using log aliquots in three different volumes, those being 1 liter, 5 liters, and 10 liters. The level of cationic polymer and anionic polymer was held constant at one gram. The results of this mixture are reflected in Table V.

TABLE V

| Solution | Polymer Conc. g/l (%) | Color/Pigment Removal |
|---|---|---|
| 1 | 1.0 | 99–100 |
| 2 | 0.5 | 99–100 |
| 3 | 0.1 | 99–100 |

These experiments show that the rapid colorant removal method described herein reduces color and pigments in wastewater with the DICY/amine with the DICY/DETA type polymer showing the best results. In each experiment the colorant method was removed in a matter of mere minutes. In each case all colors were removed.

Although anionic polymers do not initiate coagulation or flocculation with most dyes and pigments, they rapidly react with cationic polymers to form a precipitate. These ionically charged water-soluble polymers undergo a neutralization reaction when brought in contact with each other, and then form a neutrally charged mass that is insoluble in water. This mechanism holds true for most any combination of unlike charged pairs.

Both strong and weak cationic polymers react with colorants in producing the cationic polymer/colorant complex. A strong cationic polymer is more likely to proceed to the cationic polymer/colorant complex, and stay as a complex than is a weak cationic polymer. However, as colorants with both cationic and neutral charges are removed by this method. Why this occurs is not well understood.

Experiment 5 shows that the color and pigment removal does not depend on the concentrations of the cationic and anionic polymers in solution but the stoichiometry of the colorants vs. polymer content. As each anionic polymer is mixed with each cationic polymer/colorant complex, the reaction produces a single flocculent precipitate which can be easily removed from the remaining effluent.

It is believed that the anionic polymer actually encapsulates the dye or cationic polymer/colorant complex in producing the precipitate, The colorants form a soluble equilibrium complex with the cationic polymer. The anionic polymer then encapsulates this complex forming a second complex that contains the colorants. This complex, however, is insoluble in water, thus forming the flocculent precipitate. However, again it is not completely clear why both neutral and cationic charged colorants react in this manner.

Experiment 6

Optimization of Chemicals in the Rapid Colorant Removal Method

In a further experiment, a 1 gram sample of colorant was added to each of three ten liter test sample containers of water. A 1 gram sample of water-soluble dye (direct, fiber reactive, and acid) was added to the first container. A 1 gram sample of dye pigment (sulfur and vat) was added to the second container. A 1 gram sample of paint (black) was added to the third container. To each test solution 4 grams of DETA/DYCY cationic polymer solution (30% solids) was added and stirred followed by six grams of anionic polymer (20% solids) and stirred. The flocculent precipitate that formed as a result was filtered and the filtrate evaluated for color removal. The results are shown in Table VI.

TABLE VI

| Test Solution | Percent Color Removal |
|---|---|
| 1 | 99–100 |
| 2 | 99–100 |
| 3 | 99–100 |

These results show that for every gram of colorant material, it takes approximately 1 solid gram of DETA/DICY polymer, followed by approximately 1 solid gram of anionic polymer, to remove the colorant from /wastewater.

It thus is seen that a method is now provided for the removal of colorants from wastewater in a rapid and cost efficient manner. When a wastewater stream containing colorant is first treated with a cationic polymer, and then with an anionic polymer, the colorant can easily and quickly be removed from the wastewater through flocculation and standard sediment removal techniques. The method removes a high percentage of colorant regardless of the type of colorant present. The process allows for the uniform removal of colorant without excessive cost and without the introduction of large quantities of an oxidizer.

While the invention has been described in detail, it should be understood that many modifications and additions may be made thereto, in addition to those expressly recited, without departure from the spirit and the scope of the invention as set forth in the following claims.

What is claimed is:

1. A method of removing colorants from wastewater comprising the steps of:
    (a) adding a cationic polymer to the wastewater containing colorants in an amount sufficient to form a water soluble cationic polymer/colorant complex in the wastewater, wherein said cationic polymer is a polyamine selected from the group consisting of dicyandiamide/formaldehyde polymers, epichlorohydrin/amine polymers, and dicyandiamide/amine polymers,
    (b) adding an anionic sulfonated novolac polymer to the wastewater in an amount sufficient to allow the cationic polymer/colorant complex formed in step (a) to complex with the anionic polymer to form a flocculent precipitate in the wastewater, and
    (c) separating the flocculent precipitate from the wastewater.

2. The method of claim 1 wherein step (a) a dicyandiamide/amine polyamine polymer is added to the wastewater.

3. The method of claim 2 wherein step (a) dicyandiamide/diethylenetriamine (DICY/DETA) is added to the wastewater.

4. The method of claim 1 wherein step (b) an anionic polymer is added to the wastewater in a stoichiometric equivalent amount to the cationic polymer for the cationic polymer/colorant complex to complex with the anionic polymer to form a flocculent precipitate.

5. The method of claim 1 wherein step (b) an anionic polymer is added to the wastewater in an equivalent solid gram amount to the cationic polymer for the cationic polymer/colorant complex to complex with the anionic polymer to form a flocculent precipitate.

6. The method of claim 1 wherein step (c) the flocculent precipitate is separated by filtration.

7. The method of claim 1 wherein step (c) the flocculent precipitate is separated by sedimentation.

* * * * *